(12) United States Patent
Carlough et al.

(10) Patent No.: US 7,712,076 B2
(45) Date of Patent: May 4, 2010

(54) REGISTER INDIRECT ACCESS OF PROGRAM FLOATING POINT REGISTERS BY MILLICODE

(75) Inventors: Steven R. Carlough, Poughkeepsie, NY (US); Mark S. Farrell, Pleasant Valley, NY (US); Eric M. Schwarz, Gardiner, NY (US); Timothy J. Slegel, Staatsburg, NY (US); Charles F. Webb, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 11/531,301

(22) Filed: Sep. 13, 2006

(65) Prior Publication Data

US 2008/0126759 A1  May 29, 2008

(51) Int. Cl.
*G06F 9/44* (2006.01)
(52) U.S. Cl. .................................................... 717/106
(58) Field of Classification Search ................ 717/106, 717/140–143, 131
See application file for complete search history.

(56) References Cited

U.S. PATENT DOCUMENTS

| | | | | |
|---|---|---|---|---|
| 5,237,667 A | * | 8/1993 | Murakami et al. | 712/248 |
| 5,581,777 A | * | 12/1996 | Kim et al. | 712/16 |
| 5,890,222 A | | 3/1999 | Agarwal et al. | 711/220 |
| 6,058,467 A | | 5/2000 | Broxterman et al. | 712/32 |
| 6,232,894 B1 | * | 5/2001 | Kawasaki | 341/83 |
| 6,397,379 B1 | * | 5/2002 | Yates et al. | 717/140 |
| 6,708,268 B1 | | 3/2004 | Boles et al. | 712/220 |
| 6,873,324 B2 | * | 3/2005 | Saito et al. | 345/419 |
| 6,941,545 B1 | * | 9/2005 | Reese et al. | 717/130 |
| 7,146,606 B2 | * | 12/2006 | Mitchell et al. | 717/141 |
| 2001/0055032 A1 | * | 12/2001 | Saito et al. | 345/660 |
| 2002/0133672 A1 | | 9/2002 | Van De Waerdt et al. | 711/128 |

OTHER PUBLICATIONS

Hammond et al. "Architectural and application: the performance of the NEC SX-4 on the NCAR banchmark suite" Nov. 1996, IEEE Comp;uter society, 23 pages.*

* cited by examiner

*Primary Examiner*—Anna Deng
(74) *Attorney, Agent, or Firm*—John E. Campbell

(57) ABSTRACT

Complex floating point instructions are executed under millicode control when it is not cost effective to implement its function in hardware. One of the disadvantages to executing complex instructions using millicode routines is that determining and accessing the instructions operands are costly for millicode performance. To determine what the source and target location are, the instruction text is parsed. Furthermore the millicode instruction stream must be modified to access the operand data from and write the result to the program registers specified by the complex floating point instruction. The invention overcomes these disadvantages by providing millicode with register indirect access to the program floating point registers.

18 Claims, 2 Drawing Sheets

Process for extracting the data from a program FPR to a millicode MGR through register indirect access.

FIGURE 1 Process for extracting the data from a program FPR to a millicode MGR through register indirect access.
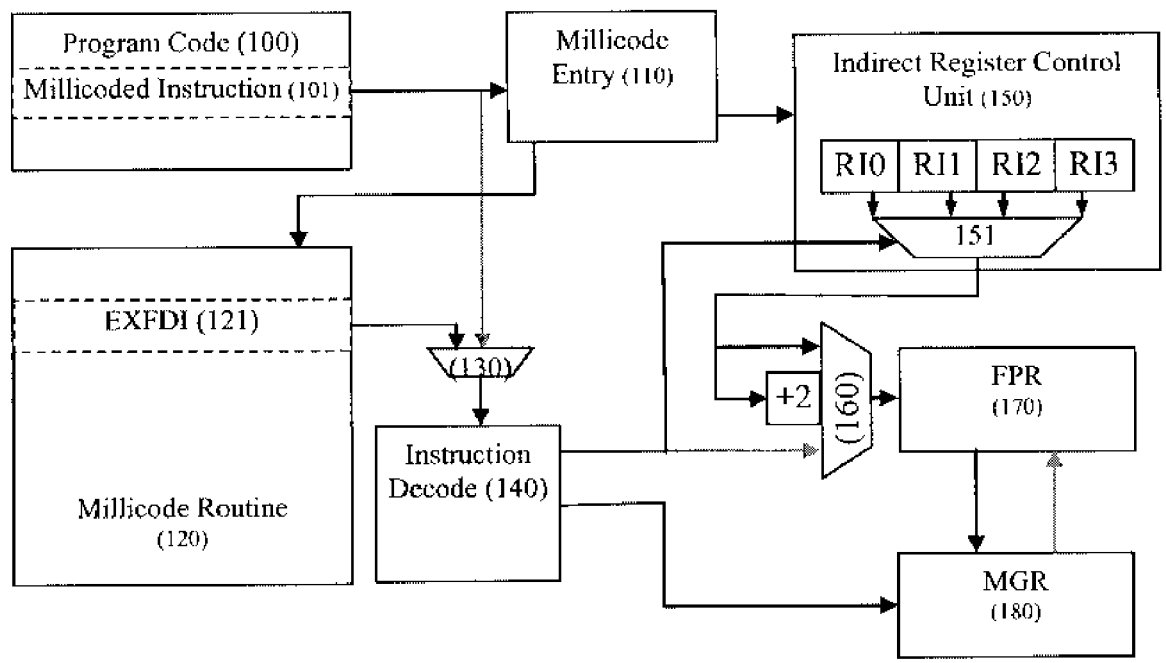

FIGURE 2 Process for setting the data for a program FPR from a millicode MGR through register indirect access.
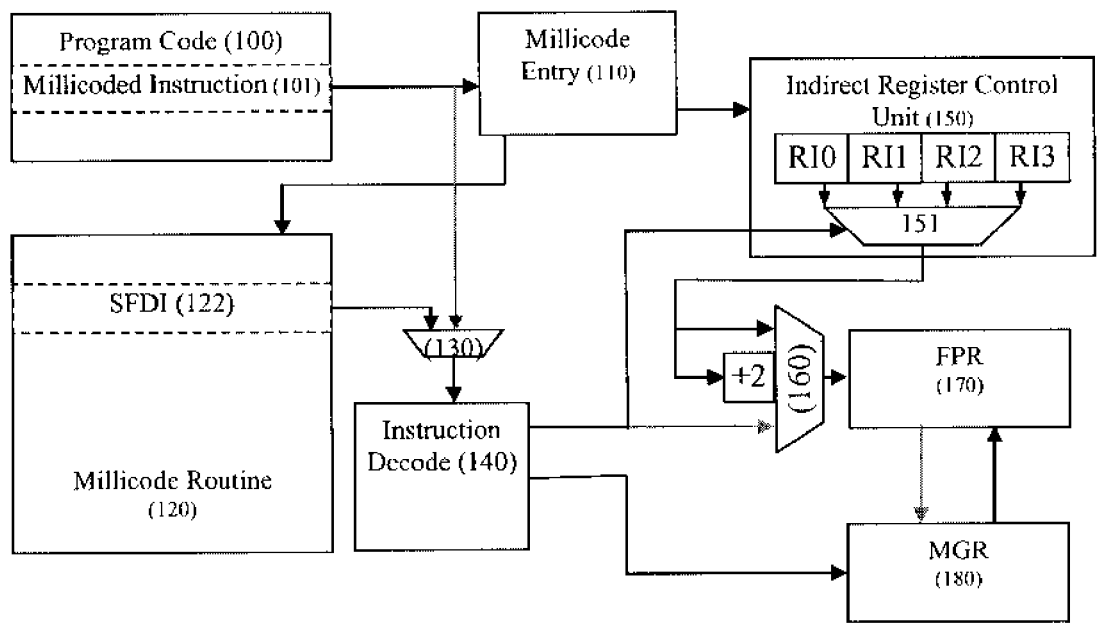

REGISTER INDIRECT ACCESS OF PROGRAM FLOATING POINT REGISTERS BY MILLICODE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to the millicode execution of complex floating point operations in a computer system conforming to the IBM z/Architecture Principles of Operations, and particularly to passing operand data from program floating point registers to millicode working registers, and passing results from the millicode working registers back to program floating point registers using register indirect accesses.

2. Description of Background

Complex instructions are executed under millicode control when it is not cost effective to implement its function in hardware alone. The function of the complex instruction is programmed in a routine that uses sequences of simpler hardware instructions.

One of the disadvantages to executing complex instructions using millicode routines is determining what the source and destination operands are for the operation. It is not known what program registers an instruction will use for any particular user program, so it is not possible to write millicode routines that move operand data directly between the program floating point registers and the millicode routine working registers. Instead, when control passes from a program to a millicode routine for the purposes of executing a complex instruction, the original instruction text is parsed to determine what program registers are the source for the instruction. Next an instruction is created that will copy the data to the millicode working registers. This process of copying program register data can be very costly for performance because it requires modifying the instruction stream. Likewise, writing the result from a millicode working register back to the program floating point register (FPR) requires the same process of parsing the instruction text, creating an instruction and forcing that instruction into the instruction stream where it is executed.

SUMMARY OF THE INVENTION

The shortcomings of the prior art are overcome and additional advantages are provided through the provision of register indirect access of the program register set. Millicode Set and Extract Program FPR Indirect instructions (herein EXFDI instructions) allow indirect register access to Program Floating Point registers by a Millicode routine. Rather then using the instruction text of the instruction to determine what the source registers are, upon Millicode entry (or Millicode startup) the register addresses for the source and target operands are written to specific hardware registers called the Register Indirect tags (RI tags). The Extract Program FPR indirect instruction can move the contents of the program's FPR address to a specified millicode working register by referencing the RI tag that contains the address of the program FPR used for the source of the operation. Similarly, another millicode instruction, the Set Program floating point register indirect instruction (herein a SDFI instruction) can write data directly to a program FPR by referencing the RI tag that contains the destination address for the operation.

Greater flexibility is available to these operations by allowing an optional offset to the program register referenced from the RI Tags. Specifically, in the z/Architecture, the 64-bit floating point registers may be paired to create a 128-bit register for extended operations, where the paired registers are always offset from each other by 2. Therefore one RI tag can be used to reference both the low register of a 128-bit floating point register pair and can optionally be incremented by 2 to reference the high register of the pair.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that will execute a Millicode instruction many cycles faster then would be possible without register indirect access to the program registers.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates one example of the process for extracting the source operand data from a program FPR to a millicode working register (MGR) through register indirect access.

FIG. 2 illustrates one example of the process for setting the data for a program FPR from an MGR through register indirect access.

The detailed description explains the preferred embodiments of the invention, together with advantages and features, by way of example with reference to the drawings.

DETAILED DESCRIPTION OF THE INVENTION

Turning now to the drawings in greater detail, FIG. 1 illustrates a preferred embodiment of a process for accessing a Program's floating point register (FPR) and writing it to a millicode working register (MGR) through register indirect access. In accordance with our process a millicode instruction that performs a register indirect access operation is called Extract Floating Point Register Indirect (EXFDI). As illustrated in FIG. 1 there is a Program Code (100) for executing a computation that contains a complex floating point instruction which is programmed with a routine that uses sequences of simpler hardware millicode instructions. This complex Floating Point instruction is referred to as a Millicoded Program Instruction (101). That Millicoded Program Instruction (101) passes the instruction text from the Program Code to Millicode Entry (110) element and to an Instruction Decode multiplexor (130). The Millicode Entry (110) sends control information such as the starting address and Instruction Text to a Millicode Routine (120) which is to perform desired operations for completing the task needed by the Millicoded Program Instruction (101). That Millicode Routine will contain one or more EXFDI instructions (121). In addition to sending control information to the Millicode Routine (120), the Millicode Entry (10) also sets Register Indirect Tags (R10, R11, R12, R13) in an Indirect Register Control Unit (150) with the addresses of the operands used by the Millicoded Program Instruction (101). Up to 3 source program Floating Point Register (FPR) addresses for the operand fields may be stored in Register Indirect Tags referred to as R11, R12 and R13 contained in 150. One register indirect tag referred to as RIO is setup during millicode entry with an address of a destination Program Floating Point Register (FPR). In the preferred embodiment these Register Indirect Tags are stored in a special millicode control register of the Indirect Register Control Unit (150). The Millicode Routine (120) contains one or more EXFDI instructions (121) and for any of these which arise in the Millicode routine (120), as well as instructions from the Program Code (100), are decoded by Instruction Decode (140). Both send instruction text to a Instruction Decode multiplexor (130) which selects the appropriate instruction text for Instruction Decode (140). During execution of the Millicode Routine (120) the Millicode Instructions such as EXFDI (which are used to set up the data for execution of the Microcode Routine (120) calculation and SFDI (which is used to provide the result of the execution of any calculation) are selected by decode multiplexor 130 for execution. This process allows for indirect register access and is the focus of this preferred embodiment. The path for program code (100) then follows and is included for completion of the desired tasks. For an EXFDI instruction (121), the decode multiplexor 130 causes the instruction decode (140) to determine which RI tag is specified by the instruction text and selects that tag with a multiplexor (151) of the Indirect Register Control Unit (150). The RI Tag specifies a source FPR address and that FPR address is sent to an FPR address multiplexor (160). For EXFDI and SFDI instructions either the RI tag or the RI tag incremented by two is selected as the address for the FPR (170). A field in these instructions determines which value (the incremented RI tag or the unincremented RI tag) is selected. Conditionally modifying the RI tag by two for an EXFDI instruction allows a single RI tag to be used to reference either the low order half or the high order half of a floating point register pair for the purposes of quad precision floating point operations used in Extended Floating Point operations within the z/Architecture. A direct path from Instruction decode to FPR address multiplexor 160 is shown for completeness and this direct path is selected when instructions (as from the Millicode Routine or Program Code) other then EXFDI and SFDI are executed. The FPR address multiplexor (160) sends the selected address for the EXFDI instruction to the FPR array (170). The data from the selected FPR address of the FPR array (170) is sent to the target Millicode General Register MGR (180). The address of the MGR to be written to with the FPR array (170) data is determined by Instruction decode (140). For a single floating point calculation the Program Code (100) will usually have two of these EXFDI operations to set up a floating point calculation when a complex floating point instruction cannot be executed directly by hardware.

The results of the calculation of the Millicode Routine (120) of FIG. 1 will need to be returned. FIG. 2 illustrates one example of a process of that return by setting a Program FPR with the contents of a specified millicode working register through register indirect access. During the millicode entry (110) described above, the RI tag (150) specified as RIO, which is the register indirect setup tag used during millicode entry with an address of a destination Program Floating Point Register (FPR), is set with the address of the program FPR that is the destination address of the Millicoded Program Instruction (101) at the point in the Program Code when a result is to be reported. Control is then passed at that point in the Program Code to the Millicode Routine (120) as has been discussed above. Before the Millicode Routine completes, the results (that are in a millicode working register MGR 180) are written to the destination Program FPR (170) using register indirect access. This is achieved by one or more SFDI instructions (122) contained in the Millicode Routine (120). The SFDI instruction text is selected by the Instruction Decode multiplexor 130 and is sent to Instruction decode (140). Instruction decode (140) sends the register indirect tag (typically RIO) that contains the address of the Program FPR (170). Instruction decode (140) also sends the address of the source MGR (180) specified by the SDFI instruction (214). Similar to the EXFDI instruction (121), the SFDI instruction (214) may specify that the address contained in the RI tag is to be incremented by two for determining the address of the program FPR (250). This is used for returning the second 64-bits of a 128-bit FPR pair for extended floating point operations.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A process for extracting the source operand data for a floating point calculation from program code stored in tangible media for a computer system, comprising the steps of:
  invoking said program code, containing a plurality of instructions including millicoded instructions, said program code including a millicode program instruction for passing instruction text from said program code to cause a millicode entry,
  entering from said millicode entry control information into a millicode routine and for setting register tags in a floating point register control unit,
  executing said millicode routine and passing therein to an extract floating point register indirect (EXFDI) instruction for extracting for a floating point calculation through register indirect addressing contents of a floating point register array and for writing said contents of the floating point register array to a millicode working register, and performing with said EXFDI instruction a register indirect access operation by passing instruction text to an instruction decoder, and determining with said instruction decoder which selected one of the register tags in said floating point register control unit is specified by the instruction text of said EXFDI instruction, and selecting the specified register tag with a multiplexor of the floating point register control unit.

2. The process of claim 1 wherein is included, specifying, by the instruction text of said EXFDI instruction the selected one of said register tags in the floating point control unit, a source floating point register address and that floating point register address is sent to a floating point register address multiplexor.

3. The process of claim 2 wherein is included, specifying, by the instruction text of said EXFDI instruction the selected one of said register tags in the floating point control unit, a source floating point register address incremented by two and that incremented floating point register address is sent to a floating point register address multiplexor.

4. The process of claim 2 wherein the process includes a step when the floating point register address multiplexor sends the selected address for the EXFDI instruction to the floating point register array and the data from the selected floating point address of the floating point register array is sent to said millicode general register.

5. The process of claim 3 wherein the process includes a step when the floating point register address multiplexor sends the selected address for the EXFDI instruction to the floating point register array and the data from the selected floating point address of the floating point register array is sent to said millicode general register to reference half of a floating point register pair for the purposes of quad precision floating point operands used in Extended Floating Point operations.

6. The process according to claim 1 wherein is included a step of sending an address of the millicode general register to the floating point register array as determined by said instruction decoder.

7. The process according to claim 1 wherein after said millicode routing step caused by said extract floating point register indirect (EXFDI) instruction for extracting for a floating point calculation through register indirect addressing contents of a floating point register array and executing for writing said contents of the floating point register array to a millicode working register, a second EXFDI instruction is encountered for a millicoded instruction of said Program code, said second EXFDI instruction extracting for said floating point calculation through register indirect addressing additional contents of said floating point register array and executing for writing said additional contents of said floating point register array to said millicode working register, whereupon said millicode routine continues a floating point calculation to be determined for said program code to reach a result to be reported.

8. The process according to claim 7 wherein the results of the calculation for the program code are returned by setting a program floating point register with the contents of a specified millicode working register through register indirect access, and wherein during a millicode entry an indirect setup tag used with an address of a destination program floating point register is set with the address of the program floating point register that is the destination address of a millicoded program instruction at the point in the program code when a result is to be reported, and wherein control is then passed at that point in the program code to the millicode routine, and before the millicode routine completes, results that are in a millicode working register are written to the destination program floating point register using register indirect access according to one or more Set Program floating point register indirect (SFDI) instructions contained in the millicode routine and selected by an instruction decode multiplexor and is sent to Instruction decoder which sends the register indirect tag that contains the address of the program floating point register, said Instruction decoder also sending the address of the source millicode working register specified by the SDFI instruction, said SFDI instruction specifying whether the address contained in a register tag is to be modified to form the address of the program floating point register for returning a second 64-bits of a 128-bit floating point register pair for extended floating point operations.

9. The process according to claim 8 wherein a modified register tag incremented by two is selected as an address for the floating point register array for EXFDI and SFDI instructions.

10. A computer system having floating point hardware for executing floating point instructions contained in program code, comprising:

a microcode execution unit for executing millicode for extracting source operand data for a floating point calculation from program code stored in tangible media for a computer system, means for invoking said program code, containing a plurality of instructions including millicoded instructions, said program code including a millicode program instruction for passing instruction text from said program code to cause a millicode entry, a millicode entry unit for entering from control information into a millicode routine store and for setting register tags in a floating point register control unit, and means for passing control from said program code to a millicode routine having an extract floating point register indirect (EXFDI) instruction for extracting for a floating point calculation through register indirect addressing contents of a floating point register array and means for writing said contents of the floating point register array to a millicode working register, and a decoder for the said EXFDI instruction which performs a register indirect access operation by passing instruction text to an instruction decoder, said instruction decoder determining which selected one of the register tags in said floating point register control unit is specified by the instruction text of said EXFDI instruction, and selecting the specified register tag with a multiplexor of the floating point register control unit.

11. The system of claim 10, including EXFDI instruction text specifying, by the instruction text of said EXFDI instruction the selected one of said register tags in the floating point control unit, a source floating point register address and that floating point register address is sent to a floating point register address multiplexor.

12. The system of claim 11 wherein is included, EXFDI instruction text of said EXFDI instruction for specifying the selected one of said register tags in the floating point control unit, a source floating point register address multiplexor for sending the incremented by two address to a floating point register.

13. The system of claim 11 wherein floating point register address multiplexor is coupled to send the selected address for the EXFDI instruction to the floating point register array and a data register is coupled from the selected floating point address of the floating point register array to said millicode general register.

14. The system of claim 12 the floating point register address multiplexor is coupled to send the selected address for the EXFDI instruction to the floating point register array and a data register from the selected floating point address of the floating point register array is coupled to be sent said millicode general register to reference half of a floating point register pair for the purposes of quad precision floating point operands used in Extended Floating Point operations.

15. The system according to claim 10 wherein said millicode general register is coupled to the floating point register array for transfer of data as determined by said instruction decoder.

16. The system according to claim 10 wherein after a first extraction for a floating point calculation through register indirect addressing contents of a floating point register array and executing for writing said contents of the floating point register array to a millicode working register, said microcode routine contains a second EXFDI instruction for a millicoded instruction of said program code, said second EXFDI instruction extracting for said floating point calculation through register indirect addressing additional contents of said floating point register array and upon execution causing writing said additional contents of said floating point register array to said millicode working register, whereupon said millicode routine is coupled to continue a floating point calculation to be determined for said program code to reach a result to be reported.

17. The system according to claim 16 wherein the results of the calculation for the program code are returned by setting a program floating point register of said floating point register array with the contents of a specified millicode working register through register indirect access, and wherein during millicode entry an indirect setup tag is provided with an address of a destination program floating point register set with the address of the program floating point register that is the destination address of a millicoded program instruction at the point in the program code when a result is to be reported, and wherein means for passing control at that point in the program code to the millicode routine are executed, such that before the millicode routine completes results that are in a millicode working register are written to a destination program floating point register using register indirect access according to one or more Set Program floating point register indirect (SFDI) instructions contained in the millicode routine and selected by an instruction decode multiplexor and sent to Instruction decoder which is coupled to send the register indirect tag that contains the address of the program floating point register, said Instruction decoder also being coupled to send the address of the source millicode working register specified by the SDFI instruction, said SFDI instruction specifying whether the address contained in a register tag is to be modified to form the address of the program floating point register for returning a second 64-bits of a 123-bit floating point register pair for extended floating point operations.

18. The system according to claim 17 wherein a modified register tag incremented by two is an address for the floating print register array for EXFDI and SFDI instructions.

* * * * *